United States Patent [19]

Carrigan et al.

[11] Patent Number: 4,890,504

[45] Date of Patent: * Jan. 2, 1990

[54] HELICAL GEARSETS

[75] Inventors: Erwin R. Carrigan, Manchester; Harold R. Johnson, III, Aberdeen, both of Ohio; Allyn E. Phillips, Maysville, Ky.

[73] Assignee: Emerson Electric Co., St. Louis, Mo.

[*] Notice: The portion of the term of this patent subsequent to Jan. 3, 2006 has been disclaimed.

[21] Appl. No.: 288,673

[22] Filed: Dec. 22, 1988

Related U.S. Application Data

[63] Continuation of Ser. No. 891,860, Jul. 30, 1986, Pat. No. 4,794,811.

[51] Int. Cl.⁴ ............................................. F16H 55/08
[52] U.S. Cl. .................................. 74/458; 74/421 R; 74/462
[58] Field of Search ................ 74/410, 458, 460, 462, 74/DIG. 12, 421 R, 421 A

[56] References Cited

U.S. PATENT DOCUMENTS

| | | | |
|---|---|---|---|
| 1,165,829 | 12/1915 | Alquist | 74/410 |
| 1,548,554 | 8/1925 | Roder | 74/410 |
| 3,765,303 | 10/1973 | Fischer et al. | 74/458 |
| 3,982,444 | 9/1976 | Rouverol | 74/462 |
| 4,031,770 | 6/1977 | Ishikawa | 74/462 |
| 4,513,637 | 4/1985 | Hirt | 74/410 |
| 4,548,562 | 10/1985 | Hughson | 418/189 |
| 4,589,300 | 5/1986 | Rouverol | 74/462 |
| 4,644,814 | 2/1987 | Rouverol | 74/462 |
| 4,651,588 | 3/1987 | Rouverol | 74/462 |
| 4,794,811 | 1/1989 | Carrigan et al. | 74/458 |

FOREIGN PATENT DOCUMENTS 1040091 8/1966 United Kingdom ................. 74/462

OTHER PUBLICATIONS

Dudley, *Handbook of Practical Gear Design*, 1984, pp. 238, 3.6, 3.9. 3.10, 3.31, 4.17, 5.38, 9.3.
Tiplitz, *Gear Contact Ratio*, 11/13/1958, all pages.

Primary Examiner—Allan D. Herrmann
Attorney, Agent, or Firm—Polster, Polster and Lucchesi

[57] ABSTRACT

A new design for helical gearsets is disclosed in which the new gearsets meet all applicable ratings and standards of the American Gear Manufacturers Association (AGMA), and yet allows very substantial cost savings over prior similar gearsets having an equivalent AGMA rating. The gearsets of the instant invention generally are substantially thinner, and have fewer, but larger, gear teeth than the prior gearsets they replace. A helical gearset of the present invention includes a pinion and a gear, with the pinion and the gear each having a plurality of teeth. Each of these teeth has a helix angle ranging between about 18 degrees and 33 degrees. The pinion and the gear each have a face width and a whole depth, with the pinion having 13 or fewer teeth, and with the pinion and the gear having a face width-to-whole depth ratio of about 4.5 or less. The axial overlap of the gearset ranges between 1.001 and about 1.2.

2 Claims, 5 Drawing Sheets

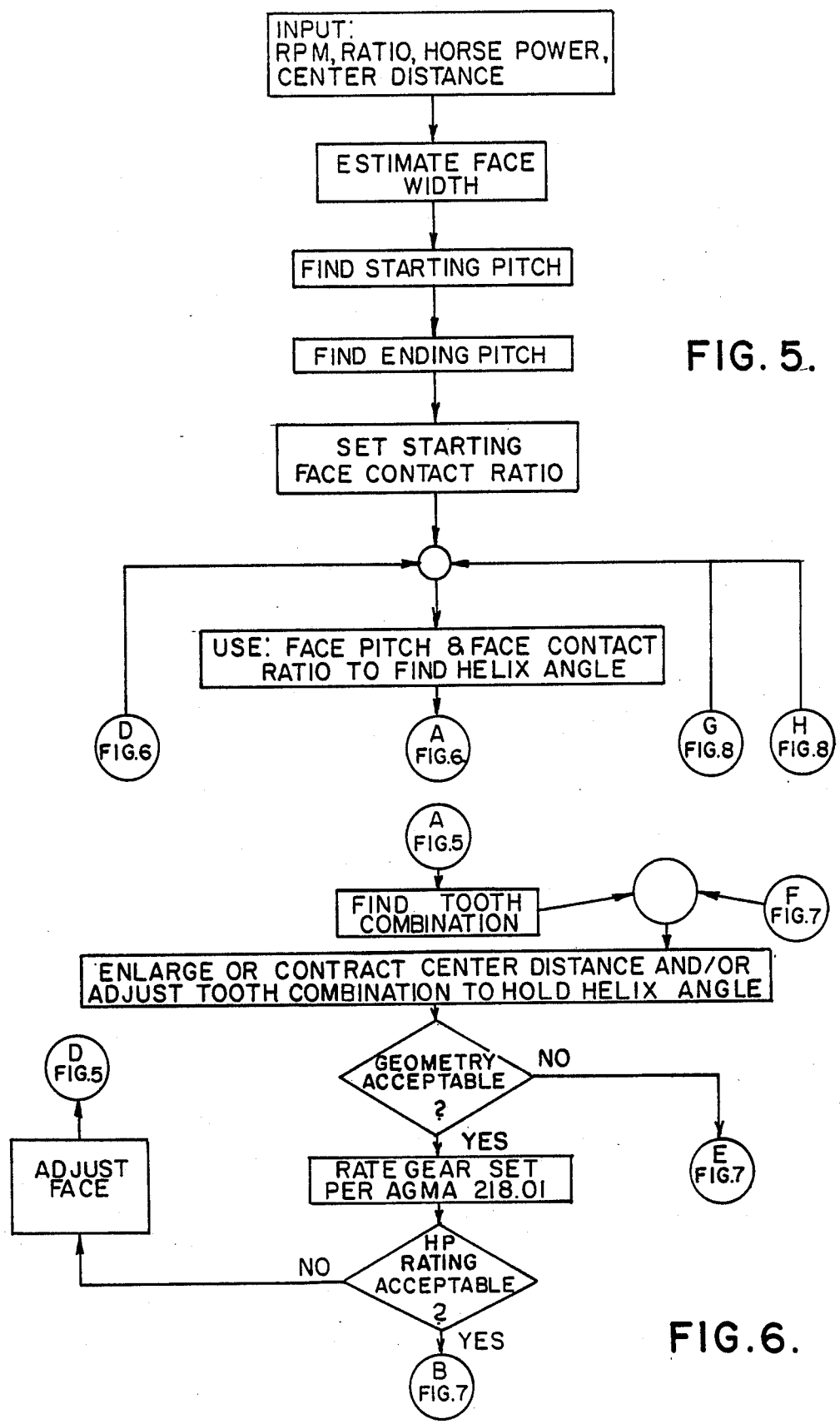

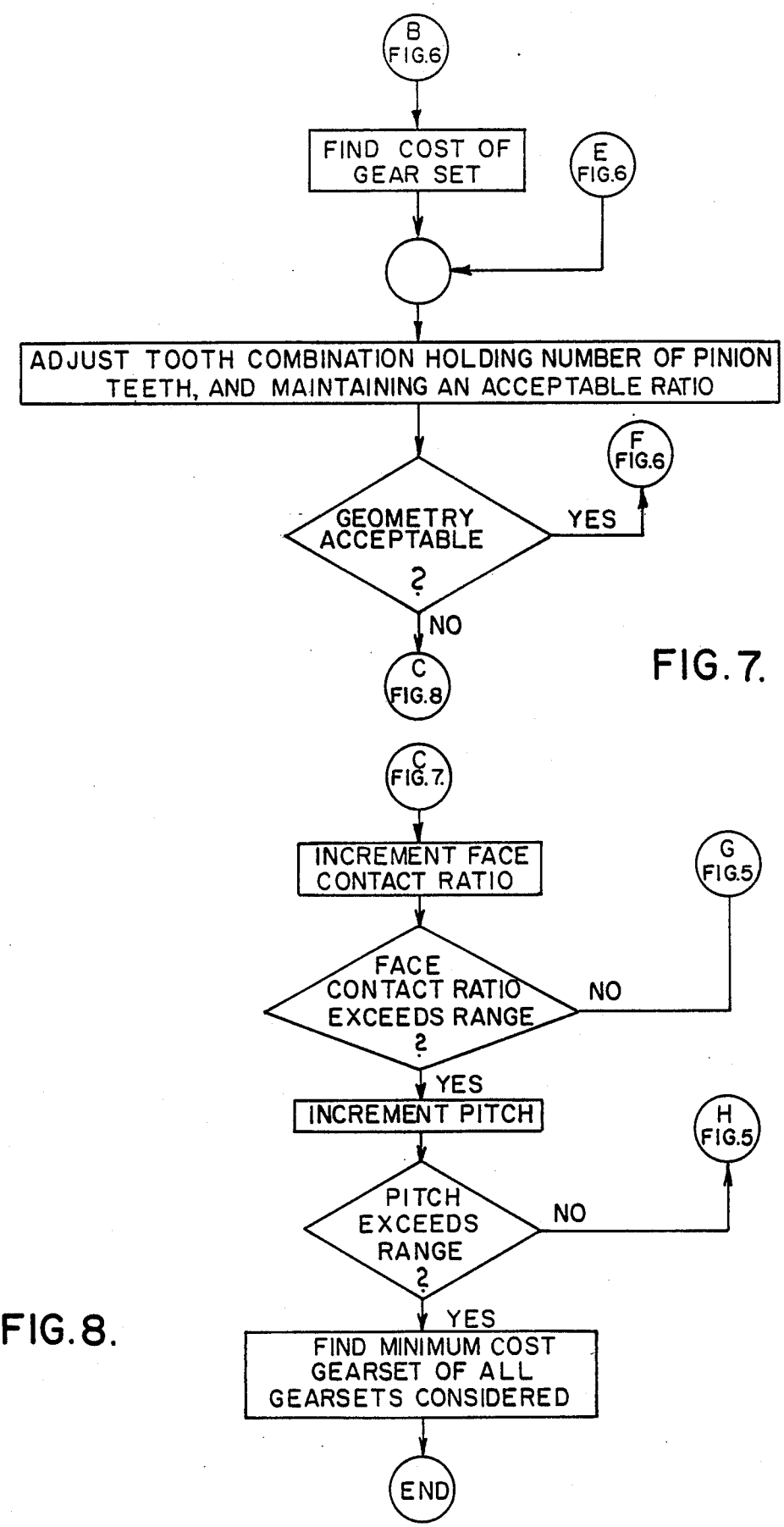

HELICAL GEARSETS

This is a continuation of copending application Ser. No. 891,860, filed on July 30, 1986, now U.S. Pat. No. 4,794,811.

This invention relates to gearsets, and more particularly, to helical gearsets. More specifically, the gearsets disclosed herein are single helical gearsets utilizing steel gear blanks, in which the gear teeth are hobbed or otherwise formed and then are carburized (or otherwise hardened) and ground (if necessary) to an acceptable American Gear Manufacturers Association (AGMA) quality and reliability level, and in which the gearsets are AGMA rated.

Generally, a gearset comprises a pinion in mesh with a gear, the smaller being the pinion and the larger being the gear. Depending on whether the pinion or the gear is the driven member, the gearset may be a speed reducer or a speed increaser. In this disclosure, the term "speed reducer" will be utilized. However, within the broader aspects of this invention, it will be recognized that the gearsets of the present invention may be utilized with speed increasers as well as with speed reducers.

The gear ratio is the number of teeth on the gear divided by the number of teeth on the pinion. Helical gears have teeth which spiral around the body of the gear, and the helix angle is the inclination of the gear tooth in lengthwise direction with respect to the axis of rotation of the pinion or the gear. Helical gearsets generally have two or more teeth in contact with one another at any given time (referred to as overlap), and the contact begins at one end of the tooth and extends along a diagonal line across the width of the tooth. Generally, helical gears are favored over spur gears because they can carry higher loads at higher speeds, and are generally of smoother and quieter operation. However, it will be understood that spur gears are merely one embodiment of helical gears in which the helix angle is 0 degrees. Thus, the gearsets of the present invention apply to spur gears as well as to helical gears.

Gear designs have been an evolving art over many centuries. As more information has become known about mathematics, gear geometry, kinematics, strength of material, fabrication, and lubrication, much of the complicated gear design information and operational knowledge has been condensed into more manageable formulas or "rules of thumb", which allow the gear designer to design and manufacture gearsets having desired operational characteristics and load-carrying capabilities. Over the years, the American Gear Manufacturers Association (AGMA), of Arlington, Va., has developed and published a series of standards and ratings which enable gear designers and users to make rating calculations to establish that a given gearset is suitable in size and quality to meet the specified requirements of a gear application (i.e., to ensure that the gearset will transmit a specified horsepower at a known speed under a desired loading condition for a predetermined service life). These AGMA standards and ratings are updated periodically, and thus are an accurate reflection of the current state of the art in gear design and manufacture. In many gear applications, there is a contractual obligation that the gearing must meet all applicable AGMA standards.

In the design of helical involute gear teeth, AGMA standards require that the gear tooth design have sufficient bending strength and pitting resistance to result in a gearset which will carry its intended horsepower load for a prescribed service life with a desired level of reliability. Generally, the bending strength of gear teeth is a fatigue-related phenomena, dependent on the resistance to cracking of the gear tooth at the tooth root fillet caused by repeated application of bending loads to each tooth each time the gear tooth is in mesh with its mating gear. Pitting resistance is also a fatigue-related phenomenon. However, pitting is a result of contact pressures (i.e., Hertz stresses) between the meshing gear teeth of the gearset exceeding the limitations of the gear tooth material. In rating a gearset, it is necessary to rate the gearset both with regard to its resistance to pitting at a rated load (typically expressed in horsepower), and with regard to bending strength at its rated load or horsepower. The lower of the pitting resistance power rating or the bending strength power rating is then used as the power rating for that gearset. AGMA Standard 218.01, dated December, 1982, sets forth the pitting resistance and bending strength of spur and helical involute gear teeth. AGMA Standard 218.01 is herein incorporated by reference.

Over the years prior to this invention, gearset designs have evolved which work well for their intended uses or applications. As advances in knowledge came along, the AGMA standards were updated so that the AGMA standards reflected both the state of the art and operational experience of many gear manufacturers or users of gears made in accordance with AGM standards. However, in general, the AGMA standards or ratings did not take the cost of manufacturing a gearset into account. Instead, a series of general design guidelines or rules of thumb of helical gear design evolved. First, it was generally recognized that the ratio of pinion face width divided by pinion pitch diameter should be 1.5 or less, so as to avoid torsional twist of the pinion which tends to concentrate the load on one end of the pinion. Additionally, except for extremely low speed (e.g., about 50 rpm or less) applications, the minimum number of pinion teeth should be 14 or more. However, for most applications, 16 or more pinion teeth are preferred. A fewer number of teeth will result in unsatisfactory wear and undue noise. In helical gearsets, the face overlap (overlap) should be 1.2 or greater so as to ensure that, at all times, there is load sharing by adjacent teeth. Additionally, it is usually advisable to keep the helix angle relatively low (e.g., 5–15 degrees) so as to limit the thrust loads applied to the helical gear.

As noted above, cost considerations are not taken into account by the AGMA standards and rating system, and are not reflected by the above-noted generally followed design guidelines. However, gear designers have developed some costing rules of thumb which are usually taken into account during the design of a gearset. Generally, it was heretofore thought that a helical gearset having the shortest center distances and the widest faces practical are most cost-effective. Also, coarse pitches were thought to be more costly than fine pitches. As will be noted, these cost guidelines are at direct odds with the above-noted design guidelines in many respects.

Over the years, helical gearset designs have evolved which work well and meet the AGMA standards and rating system. However, the question remained: Were the prior art gearsets the most economical designs which met the AGMA rating standards?

SUMMARY OF THE INVENTION

Among the several objects and features of this invention may be noted the provision of gearsets which meet AGMA ratings and standards, and yet which reflect a very significant cost savings (e.g., 20–35 percent) over older similar designs of the same rating capacity;

The provision of such gearsets which are of significantly lighter weight than the prior equivalent gearsets which they replace;

The provision of such gearsets which may be much more readily fabricated with existing gear production machines than the prior gearsets which they replace;

The provision of such gearsets which are of compact design, thus requiring less shaft space within a speed reducer or the like; and The provision of a gear design methodology which allows gearsets having the above-noted features to be designed.

Other objects and features of this invention will be in part apparent and in part pointed out hereinafter.

Briefly stated, a helical gearset of the present invention comprises a pinion and a gear, with the pinion having a having a normal operational rotation speed up to about 2400 rpm or more. The pinion and gear each have a plurality of teeth. Each tooth has a helix angle ranging between about 18 degrees and 33 degrees. The pinion and the gear each have a face width (i.e., active face width) and a whole depth (i.e., the radial depth of the tooth from the addendum circle to the dedendum circle). The pinion has 13 or fewer teeth, and the pinion and the gear each have a face width-to-whole depth ratio of about 4.5 or less.

BRIEF DESCRIPTION OF THE DRAWINGS

FIGS. 5 and 6 illustrate, in block diagram form a first step in the selection of a gearset of the present invention in which the geometry of the gearset is evaluated to determine if the geometry is acceptable;

FIG. 7 illustrates, in block diagram form, how the geometry of the gearset is varied if the geometry as determined in FIGS. 5 and 6, is not acceptable;

FIG. 8 illustrates the methodology of finding the cost of a gearset, as selected by the methodology of FIGS. 5–7;

Corresponding reference characters indicate corresponding parts throughout the several views of the drawings.

DESCRIPTION OF PREFERRED EMBODIMENTS

Figure 1:
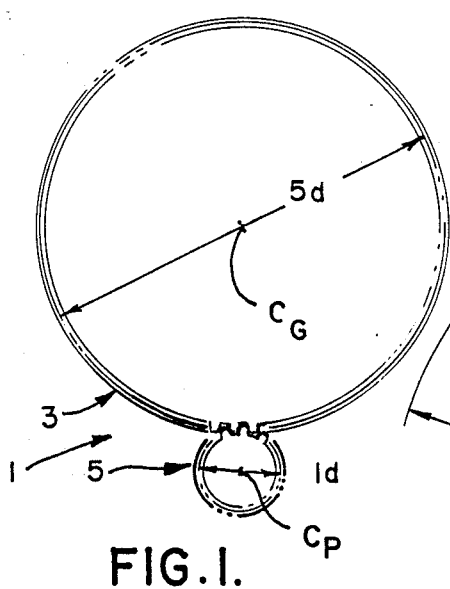
FIG. 1 is a side elevational view of a pinion in mesh with a gear constituting a gearset having a gear-tooth ratio (i.e., the number of teeth on the gear divided by the number of teeth on its mating pinion) of five.

Referring now to the drawings, and particularly to FIG. 1, a gearset, as indicated in its entirety at 1, is shown to comprise a gear 3 mounted for rotation on its center $C_G$. A pinion 5 is in mesh with gear 3, and the pinion is mounted for rotation on its center $C_P$. As illustrated, the gearset 1 has a gear-tooth ratio (i.e., the number of teeth on the gear divided by the number of teeth on its mating pinion) of five. However, within the broader aspects of this invention, any gear-tooth ratio may be utilized.

Figure 2:
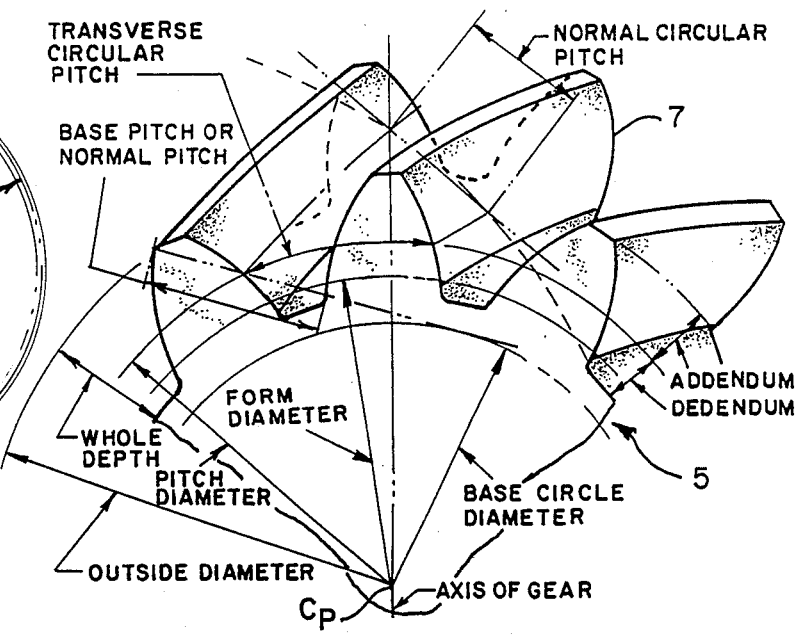
FIG. 2 is a perspective side elevational view of a portion of a helical pinion made in accordance with this invention, illustrating standard helical gear terminology.
Figure 3:
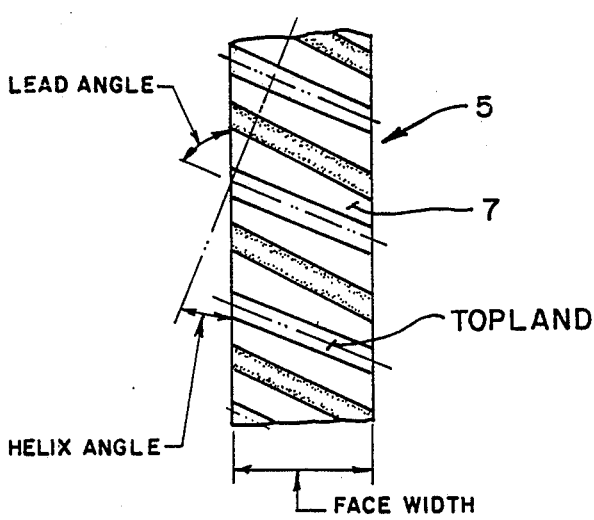
FIG. 3 a flat pattern layout of the gear teeth of the helical gear pinion shown in FIG. 2, and further illustrating helical gear terminology.

More specifically, gear 3 and pinion 5 are shown to be helical gears, each having a plurality of helical gear teeth 7 formed thereon in mesh with one another, as shown in FIG. 1. As shown in FIG. 2, in which only a segment of pinion 5 is illustrated, conventional helical gear terminology is listed. FIG. 3 is a flat pattern layout of a segment of pinion 5, and additional helical gear terminology is listed thereon.

In order to develop the design of a helical gearset of the present invention, which meets the American Gear Manufacturers Association (AGMA) standards and ratings, and which, in accordance with this invention, reflects very significant cost savings (e.g., ranging between about 20–35 percent over prior art gearset designs having the equivalent AGMA ratings), a methodology of design was utilized which not only rated a wide variety of gearset parameters to ensure that the gearsets were in conformance with AGMA standards and ratings, but fabrication costs were taken into account as well. In this methodology, as will be hereinafter set forth in detail, as few as possible of the gearset design parameters were fixed, and the old gear design guidelines heretofore discussed and the previous cost guidelines were not taken into account.

Generally, in the methodology utilized to develop the gearsets of the present invention, the gearset ratio, the gear center distances, the power to be transmitted, and the input or output speed (rpm) were given. As gound rules utilized in the methodology of the present invention, the gearsets were to be helical gears and were to be fabricated from steel blanks, preferably, but not necessarily, from forged steel blanks. The gearsets were to be carburized and ground. However, other heat treating methods may be used. Also, predetermined quality and reliability levels were established. From geometry considerations, it was decided that the pinion would have 11 or more teeth. Since helical gearsets were to be utilized, it was necessary to have a face overlap greater than one so that the rating procedure of helical gears could be used.

In FIGS. 5–9, a complete block diagram flow chart of the methodology of the present invention, utilized to design or choose gearsets of the present invention, is shown.

As shown in FIGS. 5 and 6, a first step in the selection of a gearset for a given horsepower, speed (rpm), ratio, and center distance was evaluated to determine that the geometry of the gearset would result in a proper gearset having acceptable geometry. As shown in FIG. 7, if the geometry is not acceptable or proper, the tooth combination was adjusted, holding to the number of pinion teeth constant and maintaining an acceptable ratio, was repeatedly carried out until such time as the geometry of the gearset was acceptable. Once an acceptable geometry was found, the acceptable gearset was then rated in accordance with AGMA rating standards 218.01, December, 1982, which is herein incorporated by reference.

More particularly, in accordance with AGMA rating standard 218.01, the gearset was rated both with regard to pitting resistance strength, and with regard to bending strength power (see FIG. 6). The lower rating power (i.e., either the lower of the pitting resistance power rating, or the bending strength power rating) was utilized. If the horsepower rating was not acceptable (i.e., if the gearset would not carry the specified horsepower as determined by the initial input), then the face width of the gearset was adjusted until an acceptable horsepower rating was found.

Then, as shown on FIGS. 7 and 8, the cost of manufacturing the gearset having an acceptable horsepower rating was determined. Generally, these costs included the cost of the material (i.e., the gear blanks) from which the gearset was made, the hobbing costs, and the grinding costs. More specifically, the costing subroutine is illustrated in detail in FIG. 9.

This procedure resulted in gear information generally similar to that shown in Table 1 below. More specifically, the gear information set forth in Table 1 is for a 6.250 inch center distance gearset, having a ratio of 5.00. In Table 2, additional information is presented for the gearset described in Table 1 at various operating speeds. The gearsets described in detail in Tables 1 and 2 are for gearsets N-207-5-HS and N-207-LS, as listed on Table 3 hereafter presented.

TABLE 1

| Gearset Information N-207-5-HS and N-207-LS | | | |
|---|---|---|---|
| 6.250 - 8 | | Ratio 5.0000 | |
| | Pinion | | Gear |
| Number of teeth | 13 | | 65 |
| Normal Diametral Pitch | | 7.00000 | |
| Normal Pressure Angle | | 20.00000 | |
| Helix Angle | | 26.45238 | |
| Operating Center Distance | | 6.25000 | |
| Face Width | | 1.06400 | (F/D = 0.491) |
| Outside Diameters | 2.4519 | | 10.6195 |
| Base Circle Diameter | 1.9216 | | 9.6080 |
| Standard Pitch Diameter | 2.0743 | | 10.3716 |
| Operating Pitch Diameter | 2.0833 | | 10.4167 |
| Normal Operating; Pressure Angle 20.53914; Helix Angle 26.55164 | | | |
| Base Helix Angle 24.74556; Transverse Diametral Pitch 6.26713 | | | |
| Transverse Pressure Angle; STandard 22.12332; Operating 22.72577 | | | |
| Contact Ratio; Total 2.36676; Transverse 1.31069; Face 1.05607 | | | |
| Stress Correction Factor | 1.4798 | | 1.5958 |
| Tooth Form Factor | 0.4951 | | 0.5304 |
| Min. Length of Contact 1.51625 AGMA Load Sharing Ratio 0.70173 | | | |
| 0.00021–0.00020 J-Factor | 0.4768 | | 0.4736 |
| I-Factor | | 0.25013 | |
| K-Factor = | 1625 | | |
| Unit Load = | 19743 | | |

TABLE 2

Gearsets N-207-5-HS and N-207-LS
6.250-8

| Gear Speed RPM(G) | Pitting Resistance Rating (HP) PAC | Pinion Bending Strength Rating (HP) PAT(P) | Gear Bending Strength Rating (HP) PAT(G) | Pitch Line Velocity (FPM) PLV | Speed Pinion RPM(P) |
|---|---|---|---|---|---|
| 10.00 | 2.627 | 2.479 | 2.462 | 27. | 50.00 |
| 20.00 | 5.204 | 4.910 | 4.877 | 55. | 100.00 |
| 30.00 | 7.750 | 7.312 | 7.264 | 82. | 150.00 |
| 40.00 | 10.272 | 9.692 | 9.628 | 109. | 200.00 |
| 50.00 | 12.774 | 12.053 | 11.973 | 136. | 250.00 |
| 60.00 | 15.259 | 14.397 | 14.301 | 164. | 300.00 |
| 70.00 | 17.727 | 16.726 | 16.615 | 191. | 350.00 |
| 80.00 | 20.182 | 19.042 | 18.915 | 218. | 400.00 |
| 90.00 | 22.623 | 21.345 | 21.203 | 246. | 450.00 |
| 100.00 | 25.052 | 23.637 | 23.480 | 273. | 500.00 |
| 110.00 | 27.470 | 25.918 | 25.746 | 300. | 550.00 |
| 120.00 | 29.877 | 28.189 | 28.002 | 327. | 600.00 |
| 130.00 | 32.274 | 30.451 | 30.248 | 355. | 650.00 |
| 140.00 | 34.661 | 32.703 | 32.486 | 382. | 700.00 |
| 150.00 | 37.040 | 34.947 | 34.715 | 409. | 750.00 |
| 160.00 | 39.409 | 37.183 | 36.936 | 437. | 800.00 |
| 170.00 | 41.771 | 39.411 | 39.149 | 464. | 850.00 |
| 180.00 | 44.124 | 41.632 | 41.355 | 491. | 900.00 |
| 190.00 | 46.470 | 43.845 | 43.553 | 519. | 950.00 |
| 200.00 | 48.808 | 46.051 | 45.745 | 546. | 1000.00 |
| 210.00 | 51.140 | 48.251 | 47.930 | 573. | 1050.00 |
| 220.00 | 53.464 | 50.444 | 50.108 | 600. | 1100.00 |
| 230.00 | 55.782 | 52.631 | 52.281 | 628. | 1150.00 |
| 240.00 | 58.093 | 54.812 | 54.447 | 655. | 1200.00 |
| 250.00 | 60.398 | 56.986 | 56.607 | 682. | 1250.00 |
| 260.00 | 62.697 | 59.155 | 58.762 | 710. | 1300.00 |
| 270.00 | 64.990 | 61.319 | 60.911 | 737. | 1350.00 |
| 280.00 | 67.277 | 63.477 | 63.055 | 764. | 1400.00 |
| 290.00 | 69.559 | 65.630 | 65.193 | 791. | 1450.00 |
| 300.00 | 71.835 | 67.777 | 67.326 | 891. | 1500.00 |
| 310.00 | 74.106 | 69.920 | 69.455 | 846. | 1550.00 |
| 320.00 | 76.372 | 72.058 | 71.578 | 873. | 1600.00 |
| 330.00 | 78.632 | 74.191 | 73.697 | 901. | 1650.00 |
| 340.00 | 80.888 | 76.319 | 75.811 | 928. | 1700.00 |
| 350.00 | 83.139 | 78.442 | 77.920 | 955. | 1750.00 |
| 360.00 | 85.385 | 80.561 | 80.025 | 982. | 1800.00 |
| 370.00 | 87.626 | 82.676 | 82.126 | 1010. | 1850.00 |
| 380.00 | 89.863 | 84.787 | 84.222 | 1037. | 1900.00 |
| 390.00 | 92.095 | 86.893 | 86.314 | 1064. | 1950.00 |
| 400.00 | 94.323 | 88.995 | 88.402 | 1092. | 2000.00 |
| 410.00 | 96.546 | 91.093 | 90.486 | 1119. | 2050.00 |
| 420.00 | 98.766 | 93.187 | 92.566 | 1146. | 2100.00 |
| 430.00 | 100.981 | 95.277 | 94.643 | 1174. | 2150.00 |
| 440.00 | 103.192 | 97.363 | 96.715 | 1201. | 2200.00 |
| 450.00 | 105.399 | 99.445 | 98.783 | 1228. | 2250.00 |
| 460.00 | 107.602 | 101.524 | 100.848 | 1255. | 2300.00 |
| 470.00 | 109.801 | 103.599 | 102.910 | 1283. | 2350.00 |
| 480.00 | 111.997 | 105.670 | 104.967 | 1310. | 2400.00 |
| 490.00 | 114.189 | 107.738 | 107.021 | 1337. | 2450.00 |
| 500.00 | 116.377 | 109.803 | 109.072 | 1365. | 2500.00 |

Cost of Gearset: Total $81.08, including material costs of $17.26, hobbing costs of $27.31, and grinding costs of $36.51, using 1984 costing data.

More specifically, Table 2 sets out additional information of the exemplary gearset shown in Table 1 throughout a range of speeds. The first column of Table 2 gives the speed of the gear (rpm (G)). The second column, as indicated by PAC, is the pitting resistance of the gearset expressed in horsepower. The third column, as indicated by PAT (P), indicates the bending strength of the pinion, expressed in horsepower. Likewise, the fourth column indicates the bending strength of the gear, also expressed in horsepower. The fifth column, indicated by PLV, indicates the pitch line velocity of the gearset, expressed in feet per minute. Lastly, the seventh column indicates the rotational speed of the pinion, as expressed in rpm.

Further referring to Table 2, the cost of the new gearsets, identified as N-207-5-HS and N-207-LS, is calculated, using 1984 cost data from the assignee of this invention, the Browning Manufacturing Division, Emerson Electric Co., Maysville, Ky., was found to be $81.08. Of this amount, $36.51 can be allocated to grinding costs, $17.26 is allocated to material costs, and $27.31 can be allocated to hobbing costs. As comparison, the actual cost of the equivalent rated old gearset, O-207-5-HS (as shown in Table 3), which the new gearset replaces is about $117.61, representing 31.1 percent savings.

It will be understood that the gearset costs disclosed herein are cost indexes and not the total costs of manufacturing the gearsets. These cost indexes only reflect some of the more important cost parameters, such as material costs, hobbing costs, and grinding costs. Other costs, such as machining bores, keyways, bar cutoff, etc. are not taken into account.

The methodology shown in FIGS. 5-8 is in accordance with this invention used to obtain proper AGMA rated gearsets. This was done by assigning the pinion 11 teeth, or by sizing the gearset so as to have 55 total teeth, whichever is greater. This defined the minimum pitch and the gearset tooth combination. This minimum pitch was then incrementally increased one pitch at a time until it was incremented by 6 to 9 pitches, depending on ratio. At each pitch increment, gear tooth combinations were found. Then, the amount of overlap of each particular gearset was incrementally varied in predetermined steps (i.e., overlap was varied from 1.001 to 2.0 in step sizes of 0.1).

To hold the overlap, the helix angle must likewise be held. Those skilled in the art will recognize that there is a physical relationship between face, pitch, helix angle, and overlap. To do this, the center distance was made "nonstandard" by enlarging and contracting (i.e., decreasing or increasing) the number of teeth on the "standard" center distance.

Each resulting gearset was evaluated to ensure that it was a geometrically proper gearset. Each of these resulting gearsets was also rated in accordance with the AGMA rating standards, and it was costed in accordance with the methodology here above described and shown in FIG. 9. The aforementioned process was repeated for a multiplicity of gearsets by repetitive pitch increases, whereupon the least costly gearset meeting both rating and geometry constraints was selected.

Figure 10:
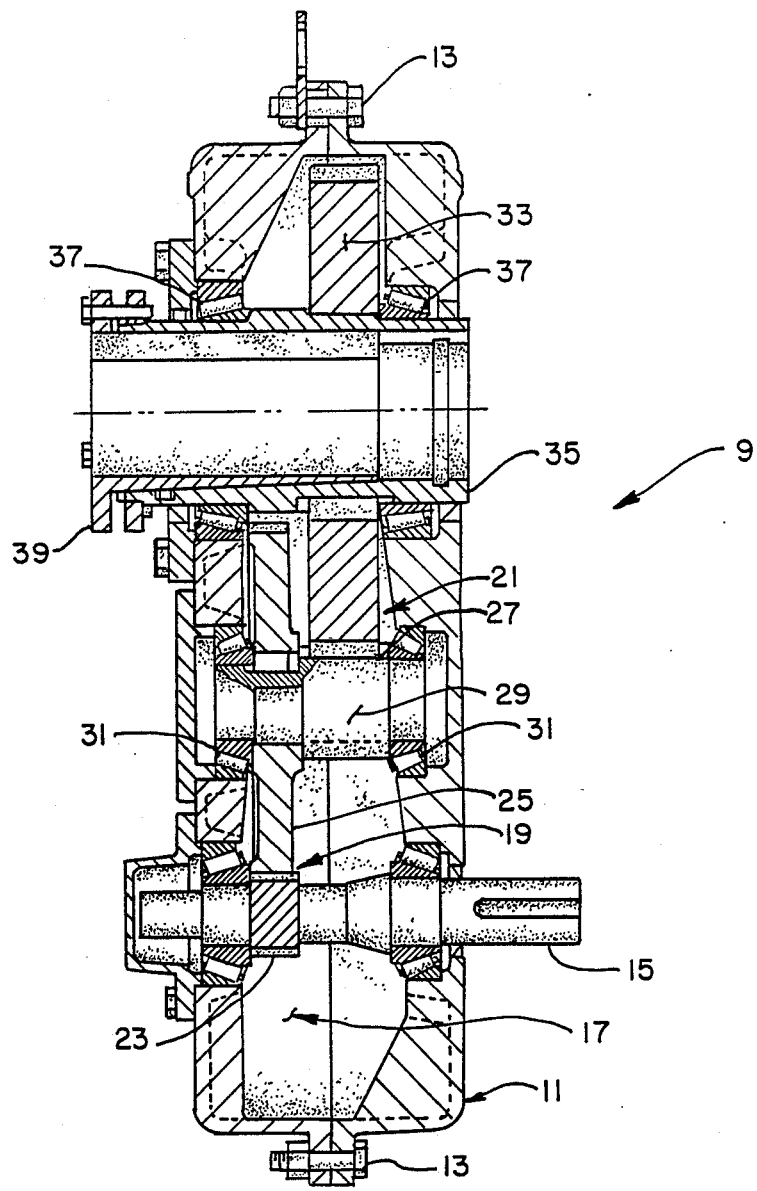
FIG. 10 is a vertical cross sectional view of a shaft mount speed reducer, utilizing the gearsets of the present invention.

In accordance with this invention, the above-noted methodology was applied to a series of gearsets utilized in whole product line of shaft mount speed reducers, as indicated generally at 9 in FIG. 10. More specifically, shaft mount speed reducer 9 includes a split housing 11 with the housing halves sealably joined together by bolts 13. The speed reducer has an input shaft 15. A gear train, as generally indicated at 17, is mounted within the housing. This gear train includes a first or high speed gearset 19, and a second or low speed gearset 21. More particularly, the high speed gearset 19 includes a high speed pinion 23 integral with the input shaft 15. The high speed pinion 23 is in mesh with a high speed gear 25. The high speed gear 25 is a compound gear having a low speed pinion 27 associated therewith. Thus, compound gear, including high speed gear 25 and low speed pinion 27, is mounted on an integral shaft 29 and journaled within suitable bearings 31 relative to the housing. The low speed pinion 27 is in mesh with a low speed gear 33. The latter is mounted on a quill 35, which in turn is journaled in bearings 37 carried by the housing. The quill includes a tapered bushing 39, as is described in detail in the co-assigned U.S. Pat. No. 4,626,114, which constitutes the output shaft of the speed reducer, and which provides for the easy mounting and off-mounting of the speed reducer relative to its application. For further details of the construction of a speed reducer utilizing the gearsets of the present invention, reference may be made to the coassigned U.S. patent application Serial No. 778,896, which is herein incorporated by reference.

As is conventional, a series of speed reducers is provided by most manufacturers to accommodate a variety of applications, ranging from input horsepowers from one quarter horsepower up to 200 horsepower, in standard sizes 107 through 608 (i.e., standard output bore sizes ranging between 1 and 7/16 inches through 6 and ¼ inches). Additionally, the ratios for these gear reducers include 5 to 1, 9 to 1, 15 to 1, and 25 to 1.

It will be understood in certain speed reducers, the low speed gearset (e.g., pinion 23 and gear 25) may be utilized as the high speed gearset of a higher rated speed reducer.

Referring now to Table 3, a comparison of the gearsets of a previous line of shaft mount speed reducers, such as is shown in FIG. 10, is shown compared to the new gearsets of the present invention, which they replace. The gearset identification is shown, for example, to include the designation "O-107-5-HS" and "N-107-5-LS". In these gearset identifications, the "O" denotes the old or prior art design, and the "N" designation designates the new gearset design of the present invention. The designation "107" designates the unit size. The designation "5" designates the overall ratio of the speed reducer in which this gearset is used. It will be noted that if the gearset identification number does not include a number similar to this last-mentioned number, that the gearset is common to all ratios in this unit size. Lastly, the designations "HS" and "LS" mean high speed (or input gearset member) and low speed (or output gearset member), respectively. For the gearsets of Table 3 which cost comparisons are shown, both the old and new gearsets have essentially the same AGMA rating.

TABLE 3

Comparison of Old and New Gearsets of Equivalent AGMA Ratings

| Gearset Identification | 1 Nom. Dia. Pitch | 2 Helix Angle | 3 Active Face Width | 4 Pinion Teeth | 5 Gear Teeth | 6 Face Width/ Whole Depth | 7 Over- lap | 8 Cost $ |
|---|---|---|---|---|---|---|---|---|
| O-107-5-HS | 16 | 26°11'04" | .930 | 17 | 86 | 6.33 | 2.107 | 63.20 |
| N-107-5-HS | 11 | 32°8'18" | .635 | 12 | 61 | 2.97 | 1.183 | 46.36 |
| O-107-9-HS | 16 | 26°11'04" | .562 | 32 | 46 | 3.83 | 1.264 | |
| N-107-9-HS | 20 | 19°29'54" | .475 | 32 | 58 | 4.04 | 1.009 | |
| O-207-15-HS | 16 | 26°11'04" | .562 | 23 | 55 | 4.04 | 1.264 | |
| N-107-15-HS | 18 | 27°41'45" | .390 | 20 | 55 | 3.83 | 1.039 | |
| O-107-25-HS | 16 | 26°11'04" | .562 | 16 | 63 | 3.83 | 1.264 | |

TABLE 3-continued

Comparison of Old and New Gearsets of Equivalent AGMA Ratings

| Gearset Identification | 1 Nom. Dia. Pitch | 2 Helix Angle | 3 Active Face Width | 4 Pinion Teeth | 5 Gear Teeth | 6 Face Width/ Whole Depth | 7 Over-lap | 8 Cost $ |
|---|---|---|---|---|---|---|---|---|
| N-107-25-HS | 18 | 31°10'27" | .383 | 12 | 61 | 2.93 | 1.136 | |
| O-107-LS | 16 | 26°11'04" | .930 | 14 | 86 | 6.38 | 2.107 | |
| N-207-LS | 11 | 32°8'18" | .635 | 12 | 61 | 2.97 | 1.183 | |
| O-115-5-HS | 12 | 22°28'51" | 1.0625 | 16 | 82 | 5.43 | 1.552 | 70.3 |
| N-115-5-HS | 9 | 27°34'0" | .765 | 12 | 60 | 2.93 | 1.014 | 53.0 |
| O-115-9-HS | 12 | 35°57'36" | .6875 | 28 | 39 | 3.51 | 1.542 | |
| N-115-9-HS | 14 | 25°10'44" | .541 | 23 | 42 | 3.22 | 1.026 | |
| O-115-15-HS | 16 | 26°11'04" | 0.6875 | 29 | 67 | 4.68 | 1.545 | |
| N-115-15-HS | 13 | 31°59'45" | .468 | 15 | 41 | 2.59 | 1.026 | |
| O-115-25-HS | 16 | 26°11'04" | 0.6875 | 19 | 77 | 4.68 | 1.545 | |
| N-115-25-HS | 15 | 26°56'26" | .511 | 11 | 56 | 3.26 | 1.105 | |
| O-115-LS | 12 | 22°28'51" | 1.0625 | 13 | 82 | 5.42 | 1.552 | |
| N-115-LS | 9 | 27°34'0" | .765 | 12 | 60 | 2.93 | 1.014 | |
| O-203-5-HS | 10 | 22°14'0" | 1.250 | 16 | 81 | 5.32 | 1.506 | |
| N-203-5-HS | 7.5 | 31°6'41" | .893 | 11 | 56 | 2.85 | 1.102 | |
| O-203-9-HS | 12 | 33°57'35" | 0.750 | 33 | 46 | 3.83 | 1.600 | |
| N-203-9-HS | 11 | 32°0'0" | 0.540 | 22 | 41 | 2.53 | 1.002 | |
| O-203-15-HS | 12 | 33°57'35" | 0.750 | 23 | 55 | 3.83 | 1.600 | |
| N-203-15-HS | 11 | 31°0'0" | 0.560 | 17 | 47 | 2.62 | 1.010 | |
| O-203-25-HS | 16 | 26°11'04" | 0.750 | 23 | 91 | 5.11 | 1.685 | |
| N-203-25-HS | 12 | 27°15'57" | 0.580 | 12 | 60 | 2.96 | 1.015 | |
| O-203-LS | 10 | 22°14'0" | 1.250 | 13 | 81 | 5.32 | 1.506 | |
| N-203-LS | 7.5 | 31°6'41" | 0.893 | 11 | 56 | 2.85 | 1.102 | |
| O-207-5-HS | 10 | 22°14'0" | 1.6875 | 18 | 91 | 7.18 | 2.032 | 117.61 |
| N-207-5-HS* | 7 | 26°27'8" | 1.064 | 13 | 65 | 3.17 | 1.056 | 81.08 |
| O-207-9-HS | 10 | 33°33'23" | 0.8125 | 31 | 44 | 3.46 | 1.429 | |
| N-207-9-HS | 12 | 20°25'59" | 0.762 | 31 | 57 | 3.89 | 1.016 | |
| O-207-15-HS | 10 | 33°33'23" | 0.8125 | 22 | 53 | 3.46 | 1.429 | |
| N-207-15-HS | 11 | 27°33'47" | 0.6300 | 20 | 55 | 2.95 | 1.021 | |
| O-207-25-HS | 16 | 26°11'04" | 0.8125 | 25 | 103 | 5.53 | 1.826 | |
| N-207-25-HS | 11 | 32°8'18" | 0.6350 | 12 | 61 | 2.97 | 1.183 | |
| O-207-LS | 10 | 22°14'0" | 1.6875 | 15 | 91 | 7.18 | 2.032 | |
| N-207-LS* | 7 | 26°27'8" | 1.064 | 13 | 65 | 3.17 | 1.056 | |
| O-215-5-HS | 8 | 21°17'14" | 1.9375 | 18 | 88 | 6.60 | 1.791 | |
| N-215-5-HS | 5.5 | 32°26'14" | 1.178 | 11 | 56 | 2.76 | 1.106 | |
| O-215-9-HS | 10 | 33°33'23" | 1.000 | 38 | 52 | 4.26 | 1.759 | |
| N-215-9-HS | 10 | 18°56'11" | 0.973 | 30 | 55 | 4.14 | 1.005 | |
| O-215-15-HS | 10 | 33°33'23" | 1.000 | 27 | 64 | 4.25 | 1.759 | |
| N-215-15-HS | 9 | 28°11'25" | 0.840 | 19 | 52 | 3.22 | 1.137 | |
| O-215-25-HS | 12 | 33°57'35" | 1.000 | 22 | 87 | 5.11 | 2.134 | |
| N-215-25-HS | 0 | 27°34'0" | 0.765 | 12 | 60 | 2.93 | 1.014 | |
| O-215-LS | 8 | 21°17'14" | 1.9375 | 14 | 88 | 6.60 | 1.791 | |
| N-215-LS | 5.5 | 32°26'14" | 1.178 | 11 | 56 | 2.76 | 1.106 | |
| O-307-5-HS | 8 | 21°17'14" | 2.625 | 19 | 94 | 8.94 | 2.427 | |
| N-307-5-HS | 5 | 26°44'41" | 1.404 | 12 | 61 | 2.99 | 1.006 | |
| O-307-9-HS | 10 | 33°33'23" | 1.0625 | 40 | 54 | 4.52 | 1.869 | |
| N-307-9-HS | 7.5 | 25°14'48" | 1.005 | 25 | 46 | 3.21 | 1.023 | |
| O-307-15-HS | 10 | 33°33'23" | 1.0625 | 28 | 66 | 4.52 | 1.869 | |
| N-307-15-HS | 7.5 | 28°45'43" | .914 | 18 | 50 | 2.92 | 1.050 | |
| O-307-25-HS | 10 | 33°33'23" | 1.0625 | 19 | 75 | 4.52 | 1.869 | |
| N-307-25-HS | 7.5 | 31°6'41" | 0.893 | 11 | 56 | 2.85 | 1.102 | |
| O-307-LS | 8 | 21°17'14" | 2.625 | 15 | 94 | 8.94 | 2.427 | |
| N-307-LS | 5 | 26°44'41" | 1.404 | 12 | 61 | 4.42 | 1.006 | |
| O-315-5-HS | 6 | 21°0'44" | 3.25 | 15 | 71 | 8.30 | 2.226 | 244.90 |
| N-315-5-HS | 5 | 17°59'14" | 2.078 | 13 | 68 | 4.42 | 1.021 | 189.99 |
| O-315-9-HS | 10 | 33°33'23" | 1.250 | 37 | 54 | 5.32 | 2.199 | |
| N-315-9-HS | 7 | 23°1'48" | 1.237 | 28 | 51 | 3.68 | 1.078 | |
| O-315-15-HS | 10 | 33°33'23" | 1.25 | 26 | 64 | 5.32 | 2.199 | |
| N-315-15-HS | 6.5 | 28°29'8" | 1.087 | 19 | 52 | 3.01 | 1.073 | |
| O-315-25-HS | 10 | 33°33'23" | 1.25 | 17 | 74 | s.32 | 2.199 | |
| N-315-25-HS | 7 | 26°27'8" | 1.064 | 13 | 65 | 3.17 | 1.056 | |
| O-315-LS | 6 | 21°0'44" | 3.25 | 12 | 71 | 8.20 | 2.226 | |
| N-315-LS | 5 | 17°59'41" | 2.078 | 13 | 66 | 4.42 | 1.021 | |
| O-407-15-HS | 10 | 33°33'23" | 1.500 | 34 | 87 | 6.38 | 2.639 | |
| N-407-15-HS | 6.5 | 28°29'8" | 1.087 | 19 | 52 | 3.01 | 1.073 | |
| O-407-25-HS | 10 | 33°33'23" | 1.500 | 23 | 98 | 6.38 | 2.639 | |
| N-407-25-HS | 7 | 26°27'8" | 1.064 | 13 | 65 | 3.17 | 1.056 | |
| O-407-LS | 6 | 21°0'43" | 3.1875 | 15 | 88 | 8.14 | 2.183 | |
| N-407-LS | 3.75 | 25°14'56" | 1.984 | 11 | 55 | 2.32 | 1.010 | |
| O-415-15-HS | 8 | 21°17'14" | 1.500 | 31 | 82 | 5.11 | 1.387 | |
| N-415-15-HS | 6 | 28°0'0" | 1.400 | 20 | 55 | 3.57 | 1.255 | |
| O-415-25-HS | 8 | 21°17'14" | 1.500 | 21 | 93 | 5.11 | 1.387 | |
| N-415-25-HS | 6 | 31°0'0" | 1.350 | 12 | 61 | 3.45 | 1.328 | |
| O-415-LS | 5 | 21°34'0" | 3.8125 | 14 | 79 | 8.11 | 2.230 | |
| N-415-LS | 3.75 | 25°0'0" | 2.830 | 12 | 61 | 4.52 | 1.428 | |
| O-507-15-HS | 8 | 21°17'14" | 1.8125 | 34 | 83 | 6.17 | 1.676 | |
| N-507-15-HS | 5 | 29°44'24" | 1.520 | 19 | 52 | 3.23 | 1.200 | |

TABLE 3-continued

Comparison of Old and New Gearsets of Equivalent AGMA Ratings

| Gearset Identification | 1<br>Nom. Dia.<br>Pitch | 2<br>Helix<br>Angle | 3<br>Active<br>Face Width | 4<br>Pinion<br>Teeth | 5<br>Gear<br>Teeth | 6<br>Face Width/<br>Whole Depth | 7<br>Over-<br>lap | 8<br>Cost<br>$ |
|---|---|---|---|---|---|---|---|---|
| O-507-25-HS | 8 | 21°17'14" | 1.8125 | 34 | 83 | 6.17 | 1.676 | |
| N-507-25-HS | 5.5 | 29°14'21" | 1.568 | 19 | 52 | 3.23 | 1.200 | |
| O-507-LS | 5 | 21°34'0" | 4.125 | 16 | 97 | 8.78 | 2.413 | |
| N-507-LS | 3.75 | 14°48'0" | 3.365 | 15 | 75 | 5.37 | 1.026 | |
| O-608-15-HS+ | 6 | 22°20'48" | 2.500 | 30 | 78 | 6.38 | 1.815 | |
| N-608-15-HS | 5 | 25°13'6" | 2.334 | 20 | 55 | 4.97 | 1.583 | |
| O-608-25-HS+ | 6 | 22°20'48" | 2.500 | 20 | 87 | 6.38 | 1.815 | |
| N-608-25-HS | 5.5 | 22°15'50" | 2.479 | 14 | 71 | 5.80 | 1.644 | |
| O-608-LS+ | 4 | 14°25'47" | 5.500 | 16 | 94 | 9.36 | 1.724 | |
| N-608-LS | 3.75 | 11°18'0" | 4.865 | 17 | 86 | 7.76 | 1.138 | |

*Described in detail in Tables 1 and 2.
+608 old style has 22.5 pressure angle gearing; all other gearing is 20° pressure angle.

Figure 4:
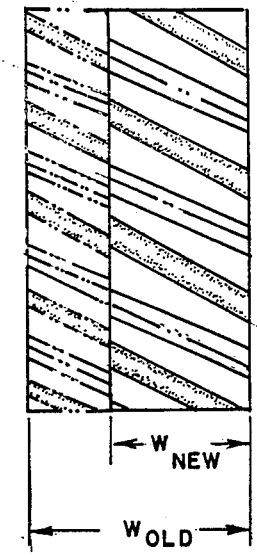
FIG. 4 a view similar to FIG. 3 of a typical gear of the present invention (shown in solid lines) compared with an equivalent prior art gear (shown in phantom) having the same AGMA rating.
Figure 11:
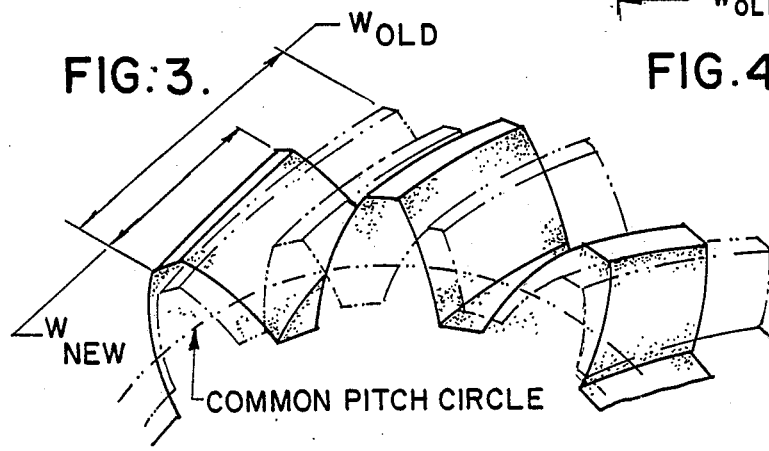
FIG. 11 (sheet 1) is a view similar to FIG. 2, comparing a pinion of the present invention to an equivalent prior art pinion having the same AGMA rating and having the same pitch circle, this drawing figure illustrating that the pinion of the present invention has substantially fewer teeth and that the face width of the pinion of the present invention is substantially narrower than the face width of the prior art pinion.
Figure 9:
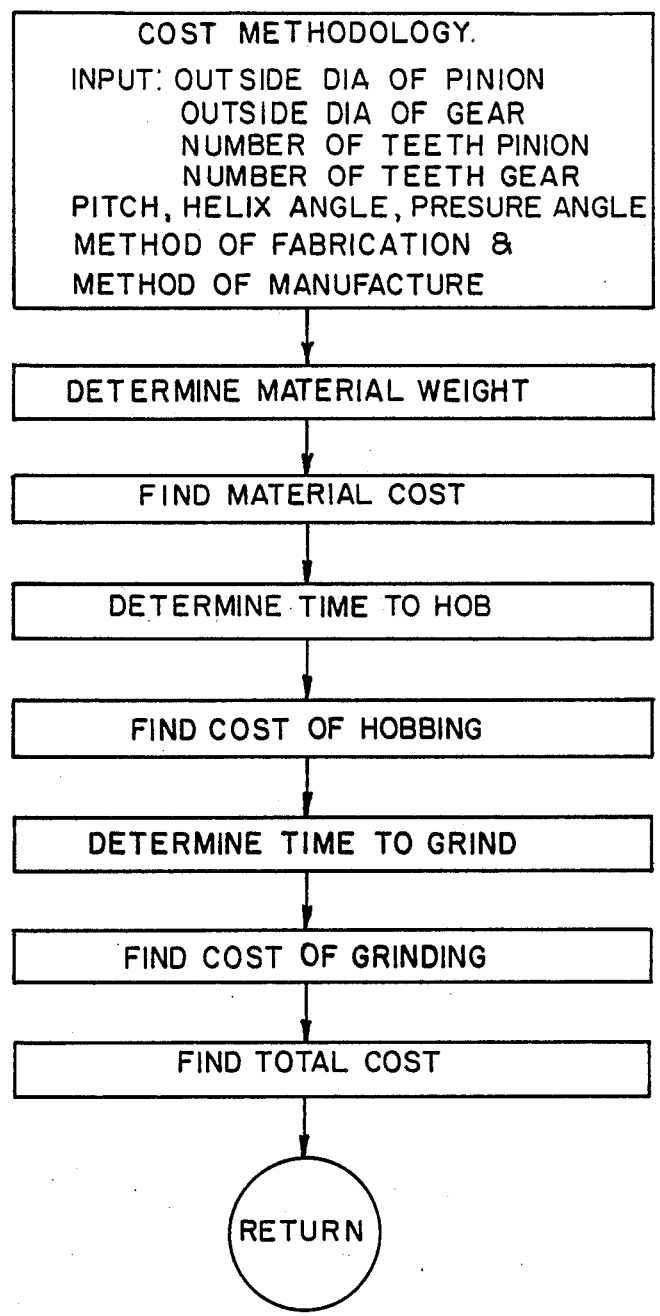
FIG. 9 is a more detailed illustration of the costing methodology of FIG. 8.

Referring to Table 3, columns 1-8 list several characteristics of the old and new gearsets used in the above-noted line of shaft mount speed reducers. It is believed that columns 1-5 indicate characteristics which will be well known to those skilled in the art and do not require discussion. However, with regard to column 6, the ratio of face width to whole depth, this characteristic of both the prior art gearsets and the gearsets of the present invention is a good dimensional indication of the non-obvious characteristics of the gearsets of the present invention, compared to equivalently rated prior art gearsets. Generally speaking, as illustrated in FIGS. 4 and 11, pinions and gears of gearsets of the present invention are substantially narrower than equivalently rated prior art gearsets and, the gears and pinions of the present invention have significantly fewer, but bigger, teeth than equivalently rated gearsets of the prior art gearsets wherein the gears and pinions of both the present invention and the prior art gearsets have substantially identical pitch diameters (see FIG. 11). The face-to-whole depth ratio is a meaningful indication of the narrower face widths and larger teeth of the gearsets of the present invention.

Column 7 of Table 3 compares the overlap of the old and new gearsets. Generally, the new gearsets of the present invention have a substantially lower overlap than the prior, equivalently rated gearsets which they replace. It is observed, from Table 3, that the new gearsets of the present invention have overlaps as near to 1.000 (or slightly greater) as possible. In comparison, many of the old gearsets had overlaps in excess of 1.500, with certain of the prior gearsets having overlaps greater than 2.000.

In accordance with this invention, the overlap for smaller size gearsets should be greater than 1.000 but less than about 1.25 and preferably less than about 1.100. For larger sizes of gearsets of the present invention, it is preferably that the gearsets have an overlap as small as possible ranging between 1.001 and about 1.6.

Further referring to Table 3, column 3, it will be noticed that in substantially all cases, the active face width of the new gearsets is less, and in most cases substantially less, than the face width of the prior art similarly sized in AGMA rated gears which they replace. It is to be understood that all of the new gearsets 1 shown in Table 3 are AGMA rated and are manufactured to AGMA Quality 10 tolerances like the old gearsets they replace. Both the old and the new gearsets were formed from forged steel blanks, and the gear teeth were carburized and ground after the gear teeth had been formed. However, within the broader aspects of this invention, steel gears of other blanks, forming techniques, heat treatment, and finishing may be made.

Referring to the number of pinion teeth (column 4 of Table 3), it will be noted that in almost all cases, the pinions of the gearsets 1 of the present invention (i.e., the new gearsets) have substantially fewer teeth than the pinions of their equivalent old gearsets. As was heretofore noted, as a prior art general design guideline, it was generally advisable for a gearset to have 14 or more (preferably 16 or more) pinion teeth so as to provide a gearset of smooth operation, and so as to avoid undue wear of the pinion teeth. Surprisingly, it has been found that the new gearsets, with substantially fewer teeth (well below the heretofore recommended minimum number of teeth), and with the active face widths of the new gear sets being, in most cases, substantially less than the active face widths of the old gearsets which they replace, result in new gearsets which have equivalent AGMA ratings, which have reliabilities at least as great as (and in most cases greater than), the old, equivalent gearsets, and which result in quiet, smooth operation of the gearsets and the speed reducers in which they are utilized.

It should also be noted that, as a general rule (but not in all cases), the helix angle (column 2 of Table 3) of the new gearsets of the present invention are oftentimes equal to or somewhat larger than the helix angle of the old equivalently rated gearsets which they replace. According to prior art design guidelines, the helix angle should be as low as possible (e.g., 5-15 degrees). Upon reviewing the gearset data presented in Table 3, it will be noted, that generally (but not in all cases), the gearsets 1 of the present invention have helix angles ranging between about 18 degrees and 33 degrees. Further, the pinion 5 and the gear 3 of each gearset 1 of the present invention generally has a face width to whole depth ratio of about 4.5 or less. Also, a majority of the gearsets 1 of the present invention have 13 or fewer pinion teeth.

As noted above, the general characteristics of the gearsets of the present invention are not universally followed within all of the gearsets shown in Table 3. However, it will be remembered that in regard to the gearset selection methodology, as set forth in FIGS. 5-9, the cost of the gearset was a driving factor of the gearsets actually selected. More specifically, in regard to FIG. 9, it will be noted that two determinations were the cost of hobbing the gear and the cost of grinding the gear after carburizing. These costs are directly related to the machines on which the hobbing and grinding operations are carried out. In certain instances, it was more economical to have gearsets wherein the pinions had more than 13 pinion teeth, and wherein the face-to-whole depth ratio was greater than 4.5, because these gearsets could be more economically fabricated on the hobbing and grinding equipment presently available. However, if the constraints of fitting a particular gearset size to existing hobbing and grinding equipment were not present, it is believed that many of the gearsets shown in Table 3 which have more than 13 pinion teeth, and which have a face width/whole depth ratio greater than about 4.5, would not be utilized. As shown in FIG. 2, the whole depth is the whole depth of the gear teeth or the sum of the addendum and the dedendum. Also, those skilled in the art will recognize that hobbing tools (i.e., the metal cutting elements of a hobbing machine) and that grinding tools or wheels are only conventionally available in discrete pitch sizes.

In other words, if available machine and tool limitations and gear case design constraints in calculating gearing costs were not required to be taken into account in the design of the gearsets shown in Table 3, it is believed that with most, if not all, of the new gearsets would have 13 or fewer teeth, and would have a face-to-whole depth ratio of 4.5 or less. Even more preferably, it would be found that the face-to-whole depth ratio of the new gearsets would be about 3.25 or less.

As previously noted, the gearsets of the present invention, as indicated by the new gearsets in Table 3, are substantially less costly than their equivalent AGMA rated gearsets, as indicated by the old gearsets in Table 3, which they replace in a series of shaft mount speed reducers. In general, the cost savings realized by replacing the old gearsets of the shaft mount speed reducer line shown in Table 3 with the new gearsets also shown in Table 3, have resulted in cost savings for the gearsets, on the average of about 20–35 percent. In Table 3, cost comparisons of four old and new gearsets are shown. These cost comparisons illustrate typical cost savings in accordance with this invention. It will be understood that both the old and the new gearsets have the same gear ratio and essentially the same AGMA rating. Additionally, both the old and the new gearsets were formed from forged steel blanks, and were carburized and ground.

Within the broader aspects of the present invention, those skilled in the art will recognize that the gearsets hereinabove discussed relate to hobbed, carburized, and ground steel gearsets. However, those skilled in the art will recognize that the methodology and gearset characteristics herein described in regard to the gearsets of the present invention may be utilized to determine gearsets for other applications which do not utilized hobbed, carburized and ground gears. For example, both the methodology and the gearset information herein disclosed and claimed may be utilized for steel, induction hardened, or through hardened gearsets as well. Also, gear blanks other than forged steel blanks may be used.

In view of the above, it will be seen that the other objects of this invention are achieved and other advantageous results obtained.

As various changes could be made in the above constructions or method without departing from the scope of the invention, it is intended that all matter contained in the above description or shown in the accompanying drawing shall be interpreted as illustrative and not in a limiting sense.

What is claimed is:

1. A helical gearset comprising a pinion and a gear wherein the pinion has a normal operational rotation speed of up to 2400 rpm or more, said pinion and said gear each having a plurality of teeth, said pinion having 13 or fewer teeth, and said gearset having an axial overlap ranging between 1.001 and 1.2.

2. A gearset as set forth in claim 1 wherein said overlap ranges between 1.001 and 1.1.

* * * * *

UNITED STATES PATENT AND TRADEMARK OFFICE
CERTIFICATE OF CORRECTION

PATENT NO. : 4,890,504

DATED : January 2, 1990

INVENTOR(S) : Erwin R. Carrigan, Harold R. Johnson, III, and Allyn E. Phillips

It is certified that error appears in the above-identified patent and that said Letters Patent is hereby corrected as shown below:

Column 2, line 30, reads "AGM", should read ---AGMA---

Column 3, line 24, reads "having a having a", should read ---having a--- (our mistake)

Column 3, line 44, reads "FIG. 3 a", should read ---FIG. 3 is a---

Column 3, line 47, reads "FIG. 4 a', should read ---FIG. 4 is a---

Column 4, line 49, reads "gound", should read ---ground--- (our mistake)

Column 8, line 22 reads "application Serial No. 778,896", should read ---No. 4,626,114---

Column 8, line 30, reads "the ratios", should read ---the conventional ratios---

In TABLE 3, column 10 (under 8 Cost $), line 4, reads "70.3", should read ---70.32---

UNITED STATES PATENT AND TRADEMARK OFFICE
CERTIFICATE OF CORRECTION

PATENT NO. : 4,890,504

DATED : January 2, 1990

INVENTOR(S) : Erwin R. Carrigan, Harold R. Johnson, III, and Allyn E. Phillips

It is certified that error appears in the above-identified patent and that said Letters Patent is hereby corrected as shown below:

In TABLE 3, column 10 (under 6 Face Width/Whole Depth), line 60, reads "s.32", should read ---5.32---

In TABLE 3, column 11 (under 4 Pinion Teeth), line 1, reads "34", should read ---23---

In TABLE 3, column 11 (under 4 Pinion Teeth), line 2, reads "19", should read ---13---

In TABLE 3, column 11 (under 5 Gear Teeth), line 1, reads "83", should read ---94---

In TABLE 3, column 11 (under 5 Gear Teeth), line 2, reads "52", should read ---66---

In TABLE 3, column 12 (under 6 Face Width/Whole Depth), line 2, reads "3.23", should read ---3.67---

In TABLE 3, column 12 (under 7 Overlap), line 2, reads "1.200", should read ---1.341---

Signed and Sealed this

Fourth Day of June, 1991

*Attest:*

HARRY F. MANBECK, JR.

*Attesting Officer*  *Commissioner of Patents and Trademarks*